(12) United States Patent
Wagner et al.

(10) Patent No.: US 12,687,445 B2
(45) Date of Patent: Jul. 21, 2026

(54) PRESSURE SENSOR PACKAGE WITH A SENSOR DIE

(71) Applicant: TE Connectivity Solutions GmbH, Schaffhausen (CH)

(72) Inventors: David Eric Wagner, Fremont, CA (US); Weijun (Davy) Xie, Shenzhen (CN); Vincent Wong, Fremont, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 410 days.

(21) Appl. No.: 18/459,567

(22) Filed: Sep. 1, 2023

(65) Prior Publication Data

US 2025/0076141 A1 Mar. 6, 2025

(51) Int. Cl.
G01L 13/02 (2006.01)
G01L 19/00 (2006.01)

(52) U.S. Cl.
CPC ........ G01L 13/026 (2013.01); G01L 19/0084 (2013.01)

(58) Field of Classification Search
None
See application file for complete search history.

(56) References Cited

U.S. PATENT DOCUMENTS

| | | | | |
|---|---|---|---|---|
| 7,013,735 B2 * | 3/2006 | Miyazawa | ............ | G01L 13/025 |
| | | | | 73/717 |
| 9,562,796 B2 * | 2/2017 | Lull | ....................... | G01L 9/0054 |
| 10,466,125 B2 * | 11/2019 | Wagner | ................. | G01L 9/0055 |
| 11,073,846 B2 * | 7/2021 | Lull | ......................... | G01F 1/363 |
| 11,604,110 B2 * | 3/2023 | Wagner | ............... | G01L 19/0069 |
| 2022/0404224 A1 * | 12/2022 | Holmes | ................... | G01L 19/14 |
| 2023/0115850 A1 * | 4/2023 | Fu | ......................... | G01L 13/026 |
| | | | | 73/716 |

* cited by examiner

*Primary Examiner* — Eric S. McCall
*Assistant Examiner* — Nigel H Plumb

(57) ABSTRACT

A sensor includes a housing having a body and a plurality of ports, a plurality of diaphragms each disposed in one of the ports, and a package having a substrate and a sensor die attached to the substrate. The body has a first face, an opposite second face, and a plurality of passageways extending through the body. The ports extend from the first face of the body. The substrate is attached to the second face of the body and the sensor die is disposed in a sealed containing space defined in part by the substrate. The substrate has a plurality of substrate passageways extending through the substrate. The passageways of the body include a plurality of first passageways that communicate with the substrate passageways.

20 Claims, 6 Drawing Sheets

PRESSURE SENSOR PACKAGE WITH A SENSOR DIE

FIELD OF THE INVENTION

The present invention relates to a sensor and, more particularly, to a sensor having a package with a substrate and a sensor die attached to the substrate.

BACKGROUND

A sensor, for example a pressure sensor, commonly has a housing and a diaphragm attached to the housing. An oil is disposed within passageways of the housing and a sensor die is disposed in the housing within the oil. When an external pressure is applied to the diaphragm, the diaphragm deflects, transferring the external pressure to the oil surrounding the die, which imparts the same external pressure to the die. The die deflects in accordance with the external pressure to generate an electrical signal representative of the external pressure.

This type of pressure sensor commonly has two diaphragms to transmit two external pressures to the die, allowing the die to measure a differential pressure between the two external pressures. The two diaphragms are often axially opposed to one another, however, which requires extensive passageways to be formed in the housing to transmit the appropriate pressures to the die. Positioning the diaphragms in an axially opposed arrangement, and positioning the die within the housing, complicates manufacturing of the sensor.

SUMMARY

A sensor includes a housing having a body and a plurality of ports, a plurality of diaphragms each disposed in one of the ports, and a package having a substrate and a sensor die attached to the substrate. The body has a first face and an opposite second face. The ports extend from the first face of the body. The substrate is attached to the second face of the body and the sensor die is disposed in a sealed containing space defined in part by the substrate.

BRIEF DESCRIPTION OF THE DRAWINGS

The invention will now be described by way of example with reference to the accompanying Figures, of which.

DETAILED DESCRIPTION OF THE EMBODIMENTS

Figure 1:
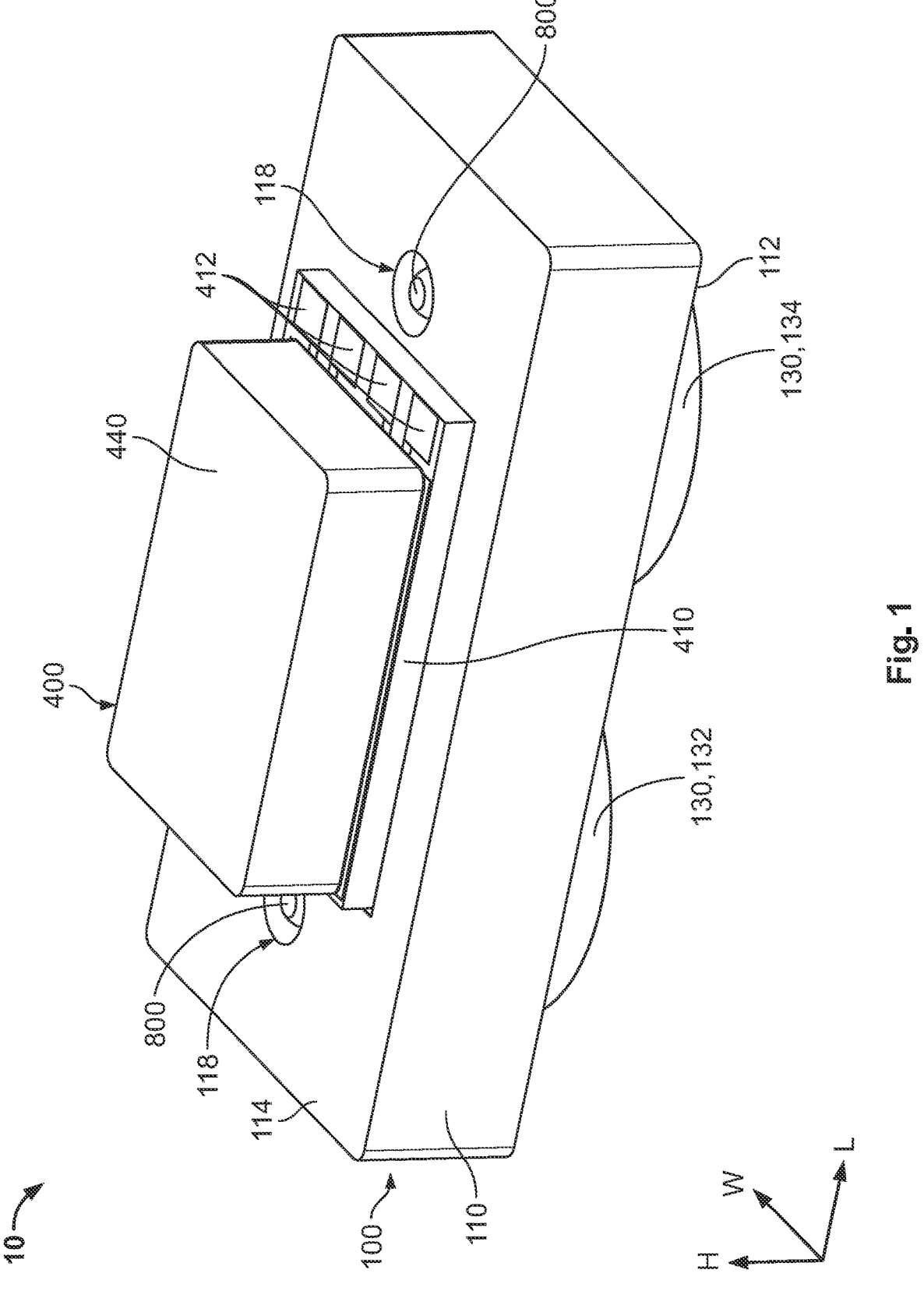
FIG. 1 is a perspective view of a sensor according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "height direction", "longitudinal direction", and "width direction". These descriptors are merely for clarity of the description and for differentiation of the various directions. These directional descriptors do not imply or require any particular orientation of the disclosed elements.

Figure 2:
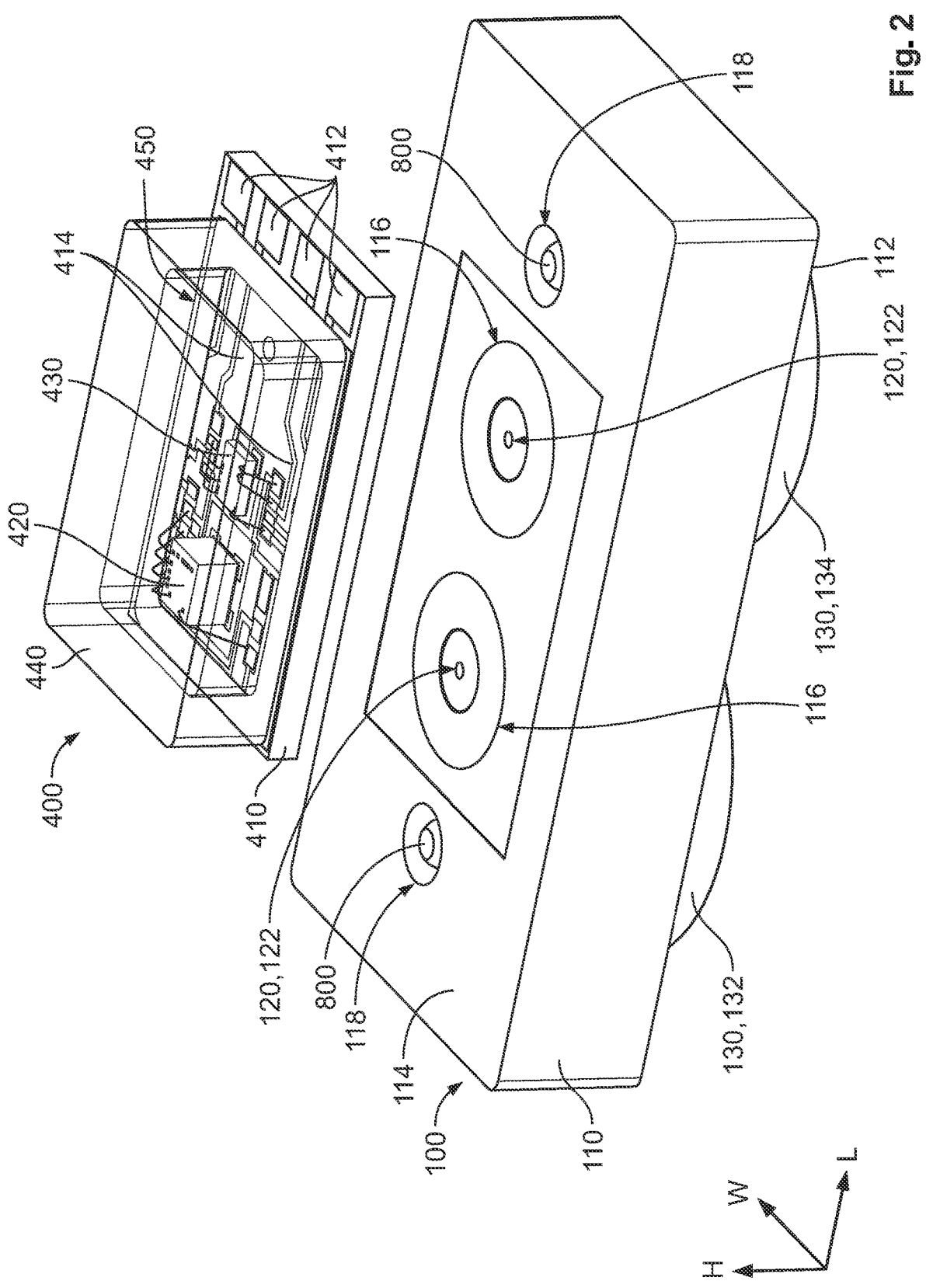
FIG. 2 is a partially exploded perspective view of the sensor of FIG. 1.
Figure 3:
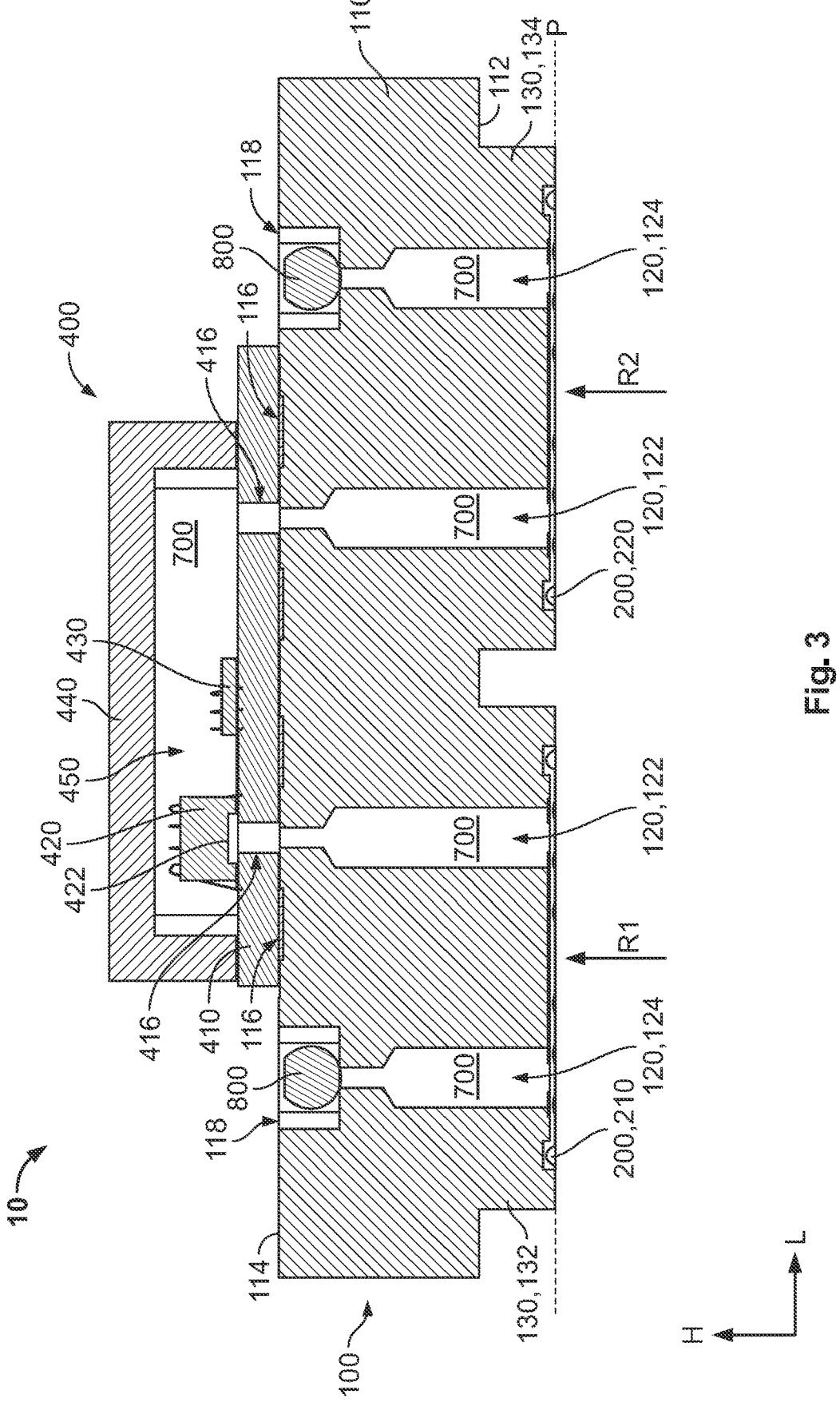
FIG. 3 is a sectional side view of the sensor of FIG. 1.

A sensor 10 according to an embodiment is shown in FIGS. 1-3. The sensor 10 includes a housing 100, a plurality of diaphragms 200 disposed in the housing 100, and a package 400 attached to the housing 100.

The housing 100 includes a body 110, as shown in FIGS. 1-3, having a first face 112 and a second face 114 opposite the first face 112 in a height direction H. The body 110 has a plurality of recesses 116 in the second face 114 and a plurality of cavities 118 in the second face 114. In the shown embodiment, the cavities 118 extend further into the second face 114 than the recesses 116 in the height direction H. In the shown embodiment, the body 110 has an approximately rectangular shape; in other embodiments, the body 110 could have a different polygonal shape.

As shown in FIG. 3, the housing 100 has a plurality of passageways 120 extending through the body 110. Each of the passageways 120 extends through the body 110 from the first face 112 in the height direction H. The passageways 120 include a pair of first passageways 122 positioned closer to a center of the body 110 in a longitudinal direction L perpendicular to the height direction H and a pair of second passageways 124 positioned closer to an outside of the body 110 in the longitudinal direction L. The first passageways 122 terminate on the second face 114 of the body 110 and, as shown in FIGS. 2 and 3, are each surrounded by one of the recesses 116 on the second face 114. The second passageways 124 terminate at one end in the cavities 118 extending into the second face 114 of the body 110 and communicate with the cavities 118.

As shown in FIGS. 1-3, the housing 100 has a plurality of ports 130 extending from the first face 112 of the body 110. The ports 130 include a first port 132 and a second port 134 separated from one another along the longitudinal direction L and defining discrete ports 132, 134 protruding from the body 110 in the height direction H. The passageways 120 communicate with the ports 130, and an end of one of the first passageways 122 and one of the second passageways 124 opposite the second face 114 opens into each of the ports 132, 134.

In the shown embodiment, the housing 100 is monolithically formed in a single piece from a metal material. In another embodiment, the housing 100 can be formed from a plurality of pieces and assembled together to form the elements of the housing 100 described above. In other embodiments, the housing 100 may be formed of conductive materials other than metal, or may be formed of a nonconductive material, such as a ceramic or a plastic.

As shown in FIG. 3, the diaphragms 200 are disposed in the ports 130 of the housing 100. The diaphragms 200 are each formed of a resiliently flexible material. The resiliently flexible material of the diaphragms 200 may be a thin metal material, such as stainless steel, or may be other conductive or non-conductive flexible materials capable of transmitting force as described in greater detail below. The diaphragms 200 may be planar elements or, as in the shown embodiment, may have a corrugated cross-sectional shape. The diaphragms 200 include a first diaphragm 210 disposed in the first port 132 and a second diaphragm 220 disposed in the second port 134. The diaphragms 210, 220 may be attached to the ports 132, 134 by welding or by any other form of attachment. The diaphragms 200 are coplanar with one another in a plane P.

The package 400, as shown in FIGS. 1-3, includes a substrate 410, a sensor die 420 attached to the substrate 410, and a cover 440 attached to the substrate 410. The cover 440 and the substrate 410 define a sealed containing space 450 in which the sensor die 420 is disposed. The cover 440 is shown translucent in FIGS. 2 and 3 for ease of explanation of the sealed containing space 450 of the package 400 but is a solid, opaque member.

In the embodiment shown in FIGS. 1-3, the substrate 410 is a hybrid ceramic circuit or a printed circuit board that includes a plurality of contact pads 412 and a plurality of traces 414 that electrically connect the contact pads 412 to the sensor die 420. In the shown embodiment, the contact pads 412 are arrayed along the substrate 410 in a width direction W perpendicular to the height direction H and the longitudinal direction L. In the shown embodiment, the substrate 410, as shown in FIG. 3, has a plurality of substrate passageways 416 extending through the substrate 410 along the height direction H.

The sensor die 420, as shown in FIGS. 2 and 3, is attached to the substrate 410 and disposed in the sealed containing space 450. The sensor die 420, in the shown embodiment, is a MEMS pressure sensor and has a membrane 422 that is resiliently deflectable in accordance with pressures. In an embodiment, the membrane 422 is deflectable in accordance with pressures on opposite sides of the membrane 422 and is a differential pressure sensor. In another embodiment, the membrane 422 is deflectable in accordance with pressure on one side of the membrane 422 and is an absolute pressure sensor. In a further embodiment, the sensor die 420 has a pair of membranes 422, with one membrane acting as a differential pressure sensor and one membrane acting as an absolute pressure sensor. The sensor die 420 is attached to the substrate 410 over one of the substrate passageways 416.

In the embodiment shown in FIGS. 2 and 3, the sensor package 400 has an integrated circuit 430, such as an application-specific integrated circuit (ASIC), attached to the substrate 410 and electrically connected to the sensor die 420 and the contact pads 412 by the traces 414. The integrated circuit 430 is positioned in the sealed containing space 450 with the sensor die 420. The integrated circuit 430 processes an electrical output signal from the sensor die 420 to determine the differential and/or absolute pressure sensed by the sensor die 420.

The cover 440, shown in FIGS. 1-3, is attached to the substrate 410 to create the sealed containing space 450. The cover 440 may be formed of a ceramic material, a metal material, a plastic material, or any combination thereof. The cover 440 may be attached to the substrate 410 by any method that defines and fluidly seals the sealed containing space 450 at an interface between the cover 440 and the substrate 410, such as an adhesive, for example an epoxy, a solder, a brazing, or a weld. In a position in which the cover 440 is attached to the substrate 410 to create the sealed containing space 450, as shown in FIGS. 1 and 2, the contact pads 412 of the substrate 410 are positioned outside of the sealed containing space 450.

To assembly the sensor 10, the package 400 is attached to the housing 100 as shown in FIGS. 1-3. The substrate 410 of the package 400 is attached to the second face 114 of the body 110 by an adhesive, for example an epoxy, a solder, a brazing, or a weld. The material attaching the substrate 410 to the second face 114 may be positioned in the recesses 116 of the second face 114. When the substrate 410 is attached to the second face 114, as shown in FIG. 3, the substrate passageways 416 are each aligned with one of the first passageways 122 along the height direction H and communicate with the first passageways 122. The cover 440 attached to the substrate 410 as described above is disposed on a side of the substrate 410 opposite the second face 114.

With the package 400 attached to the housing 100, the sensor 10 is filled with an oil 700. The oil 700 is inserted at the cavities 118 in the second face 114 and fills the second passageways 124, fills the ports 132, 134 where it is held in by the diaphragms 210, 220, and fills the first passageways 122 communicating with the second passageways 124 through the ports 132, 134, as shown in FIG. 3. The oil 700 also flows through the first passageways 122 and through the substrate passageways 416 into the sealed containing space 450, filling the sealed containing space 450 around the sensor die 420 and the integrated circuit 430. When the oil 700 is positioned in the ports 132, 134, the passageways 122, 124, and the sealed containing space 450, a passageway seal 800 is disposed in each of the cavities 118 to enclose the second passageways 124 and contain the oil 700 in the sensor 10. The passageway seal 800, in an embodiment, is a glass material that forms a glass-to-metal bond with the housing 100. In other embodiments, a different non-compressible liquid may be used in place of the oil 700.

During use of the sensor 10 to measure pressure, the sensor 10 is exposed to, for example, a first pressure R1 and a second pressure R2, as shown in FIG. 3. The first pressure R1 acts on the first diaphragm 210 in the first port 132. The first diaphragm 210 deflects in proportion with the first pressure R1 and correspondingly transmits the first pressure R1 to the oil 700 in the first passageway 122 and in the substrate passageway 416 communicating with the first passageway 122. The oil 700 in the substrate passageway 416 connected to the first port 132 imparts the first pressure R1 on a first side of the membrane 422 of the sensor die 420. The second pressure R2 acts on the second diaphragm 220 in the second port 134. The second diaphragm 220 deflects in proportion with the second pressure R2 and correspondingly transmits the second pressure R2 to the oil 700 in the first passageway 122 connected to the second port 134, and through one of the substrate passageways 416 into the sealed containing space 450. The oil 700 in the sealed containing space 450 imparts the second pressure R2 on the second side of the membrane 422 of the sensor die 420.

In an embodiment, the membrane 422 deflects according to a differential pressure between the first pressure R1 and the second pressure R2. Deflection of the membrane 422 generates an electrical signal representative of the differential pressure on the opposite sides of the membrane 422. In another embodiment, the membrane 422 can alternatively or additionally deflect according only to the first pressure R1 on one side of the membrane 422, generating an electrical signal representative of an absolute pressure. The electrical signal can be output external from the sensor 10 by the integrated circuit 430 connected to the sensor die 420 and through the contact pads 412 on the substrate 410.

Figure 4:
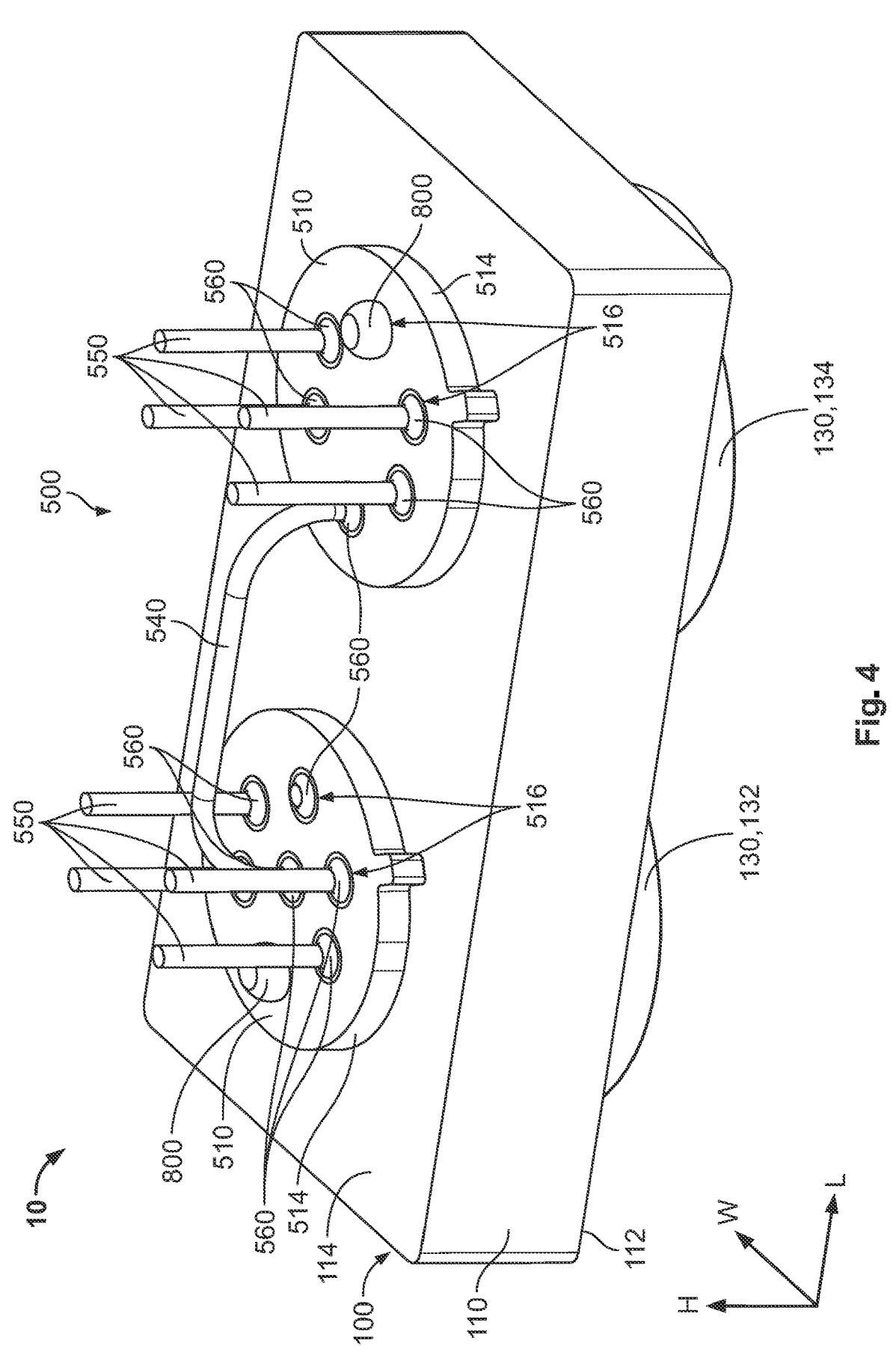
FIG. 4 is a perspective view of a sensor according to another embodiment.
Figure 5:
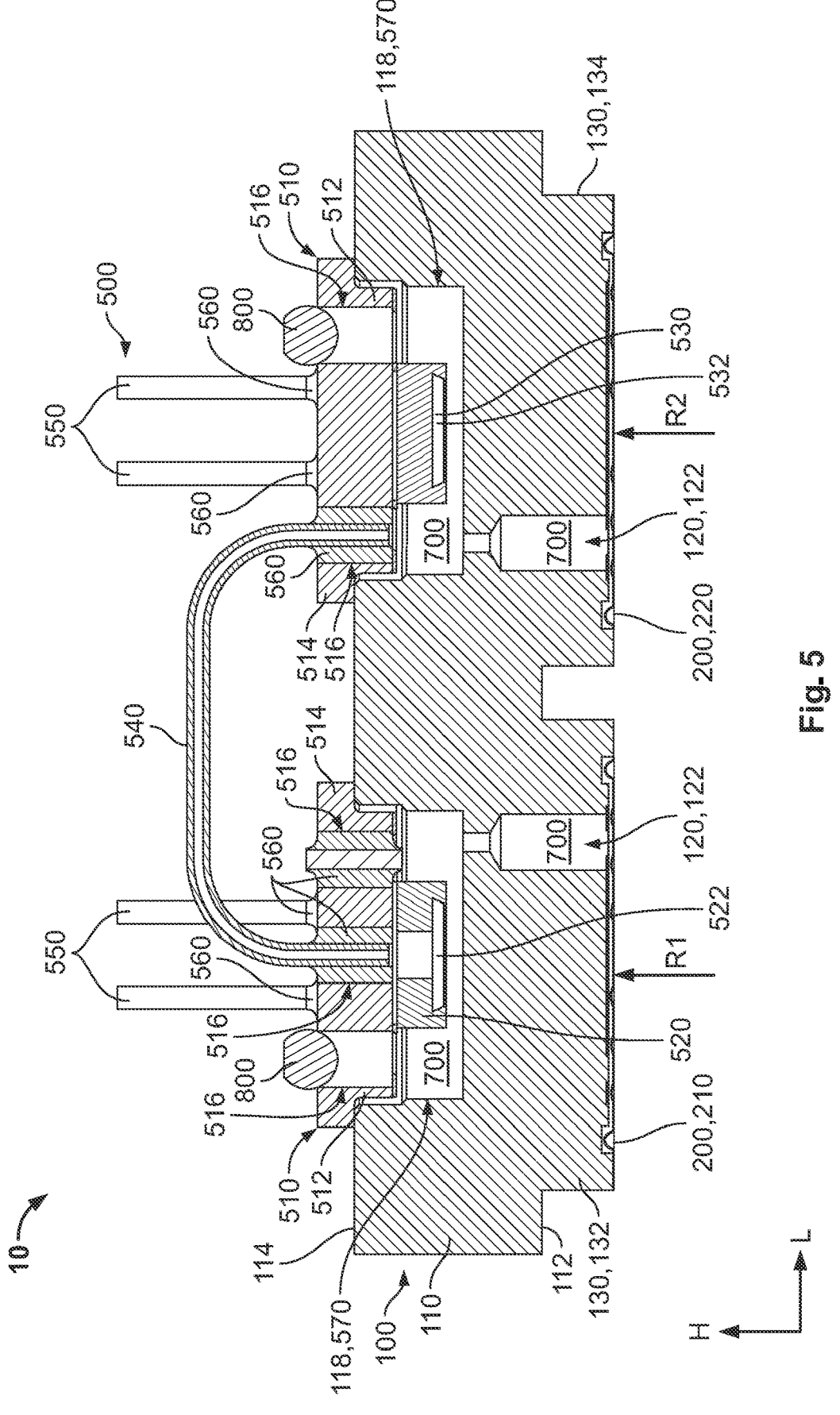
FIG. 5 is a sectional side view of the sensor of FIG. 4.

A sensor 10 according to another embodiment is shown in FIGS. 4 and 5. Like reference numbers refer to like elements and primarily the differences from the embodiment shown in FIGS. 1-3 will be described in detail.

In the housing 100 of the embodiment shown in FIGS. 4 and 5, the body 110 does not have the recesses 116 of the embodiment of FIG. 2 but only has a pair of cavities 118 extending into the second face 114, as shown in FIG. 5. The passageways 120 in the embodiment of FIGS. 4 and 5 only include first passageways 122 extending along the height direction H, each connected between one of the ports 132, 134 and one of the cavities 118.

The sensor 10 according to the embodiment of FIGS. 4 and 5 has a package 500 that includes a pair of substrates 510 each having a sensor die 520, 530 attached to the substrate 510. The substrates 510 each have a base 512 and a flange 514 extending from the base 512. The substrates 510 each have a plurality of substrate passageways 516 extending through the substrate 510 along the height direction H. In the embodiment of FIGS. 4 and 5, the substrates 510 are each a solid material without circuitry, such as a ceramic material, a metal material, a plastic material, or any combination thereof.

The sensor dies 520, 530 are each attached to the base 512 of one of the substrates 510, as shown in FIG. 5. Each of the sensor dies 520, 530 in the shown embodiment is a MEMS pressure sensor and has a membrane 522, 532 that is resiliently deflectable in accordance with pressures. In the shown embodiment, a first sensor die 520 has a first membrane 522 that is deflectable in accordance with pressures on opposite sides of the first membrane 522 and is a differential pressure sensor. In the shown embodiment, the second sensor die 530 has a second membrane 532 that is deflectable in accordance with pressure on one side of the membrane and is an absolute pressure sensor. In other embodiments, the sensor dies 520, 530 could be positioned in a reversed manner from the shown embodiment or both membranes 522, 532 could be on one die 520, 530.

The package 500 has a plurality of pins 550 extending through the substrate passageways 516 of each of the substrates 510 and electrically connected with the first sensor die 510 or the second sensor die 530. As shown in FIG. 5, the pins 550 are only positioned in some of the substrate passageways 516 of each of the substrates 510. The pins 550 are each a conductive material that can transmit an electrical signal output by the sensor dies 510, 530. The pins 550 are sealed in the substrate passageways 516 by a seal material 560. The seal material 560, in an embodiment, is a glass material that forms a glass-to-metal bond with the substrate 510. In other embodiments, the seal material 560 may be any other material that can seal the conductive pins 550 in the substrate passageways 516.

As shown in FIG. 5, to attach the package 500 to the housing 100, the substrates 510 are each positioned over one of the cavities 118 on the second face 114 of the body 110, with the flange 514 disposed on the second face 114 and the base 512 extending into the cavity 118. The flange 514 is attached to the second face 114 to secure the substrate 510 to the housing 100 with an adhesive, for example an epoxy, a solder, a brazing, or a weld. The substrates 510 each form a sealed containing space 570 with the body 110, the sealed containing spaces 570 defined in each of the cavities 118. Each of the sensor dies 520, 530 is positioned in one of the sealed containing spaces 570.

The package 500 includes a tube 540, shown in FIGS. 4 and 5, having a pair of opposite ends each positioned in one of the substrate passageways 516 of one of the substrates 510. The tube 540 is sealed to each of the substrates 510 by the seal material 560. The tube 540 fluidly connects the sealed containing space 570 formed by one of the substrates 510 to the sensor die 520 on the other of the substrates 510.

With the package 500 attached to the housing 100 as shown in FIGS. 4 and 5, the sensor 10 is filled with the oil 700. The oil 700 is inserted at one of the substrate passageways 516 of each of the substrates 510 that does not have the pins 550 or the tube 540 and fills the sealed containing spaces 570. From the sealed containing spaces 570, the oil 700 flows through the passageways 120 of the housing 100 and into the ports 130, where the oil 700 is held by the diaphragms 200. The oil 700 also fills the tube 540 from one of the sealed containing spaces 570. When the oil 700 is filled, the passageway seal 800 is disposed in the one of the substrate passageways 516 used to insert the oil 700, and the oil 700 is contained in the sensor 10. In other embodiments, a different non-compressible liquid may be used in place of the oil 700.

During use of the sensor 10 of FIGS. 4 and 5 to measure pressure, the first diaphragm 210 deflects in proportion with the first pressure R1 and correspondingly transmits the first pressure R1 through one of the passageways 120 into one of the sealed containing spaces 570 having the first sensor die 520, imparting the first pressure R1 on a first side of the first membrane 522 of the first sensor die 520. The second pressure R2 acts on the second diaphragm 220 in the second port 134, the second diaphragm 220 deflects in proportion with the second pressure R2, and the second pressure R2 is transmitting through one of the passageways 120 and into the one of the sealed containing spaces 570 having the second sensor die 530. The second pressure R2 in the sealed containing space 570 acts on a side of the second membrane 532 of the second sensor die 530. The second pressure R2 is also transmitted through the tube 540 and acts on a second side of the first membrane 522 of the first sensor die 520.

In the embodiment of FIGS. 4 and 5, the first membrane 522 deflects according to a differential pressure between the first pressure R1 and the second pressure R2. Deflection of the first membrane 522 generates an electrical signal representative of the differential pressure in the sealed containing spaces 570 acting on opposite sides of the first membrane 522. The second membrane 532 deflects according to the second pressure R2 on a side of the second membrane 532, generating an electrical signal representative of an absolute pressure in one of the sealed containing spaces 570. The electrical signals of both second dies 520, 530 are output external from the sensor 10 by transmission along the pins 550.

Figure 6:
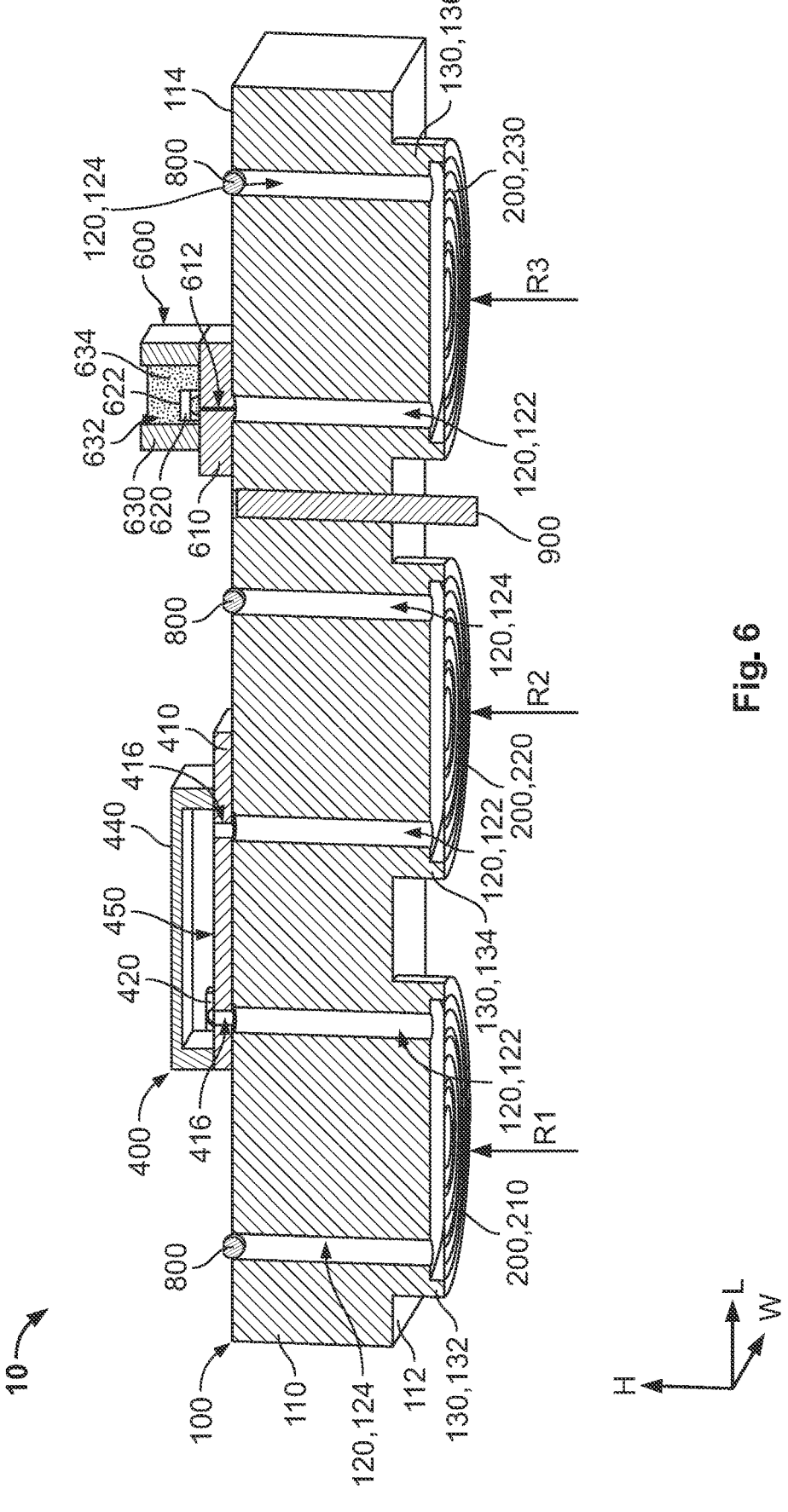
FIG. 6 is a perspective view of a sensor according to another embodiment.

A sensor 10 according to another embodiment is shown in FIG. 6. Like reference numbers refer to like elements and primarily the differences from the embodiment shown in FIGS. 1-3 will be described in detail. The package 400 of the embodiment of FIGS. 1-3 is shown schematically in FIG. 6 for clarity of the drawing but has the same structural details and position as described above with respect to FIGS. 1-3.

The sensor 10 according to the embodiment of FIG. 6 has a third port 136 in the housing 100 and a third diaphragm 230 disposed in the third port 136 as similarly described above. The third port 236 has another set of passageways 120, including the first passageway 122 and the second passageway 124 described above, that connect to the third port 136 and communicate with the second face 114 of the body 110.

As shown in FIG. 6, the sensor 10 has another package 600 disposed on the second face 114 over the first passageway 122 connected to the third port 136. The package 600 has a substrate 610, a sensor die 620 disposed on the substrate 610 and a plurality of sidewalls 630 extending from the substrate 610 around the sensor die 620. The substrate 610 and the sidewalls 630 define a sealed containing space 632 that is filled with a gel 634 around the sensor die 620.

During use of the sensor 10 of FIG. 6, the sensor die 420 of the package 400 senses a differential and/or an absolute pressure of the pressures R1 and R2 as described above. A third pressure R3 acting on the third diaphragm 230 is transmitted through the first passageway 122 and through a substrate passageway 612 of the substrate 610 to the sensor die 620 through oil, as described above. The third pressure R3 deflects one side of a diaphragm 622 of the sensor die 620, and the sensor die 620 can measure an absolute pressure of the third pressure R3.

The sensor 10 according to the embodiment of FIG. 6 can also have a temperature probe 900 positioned in the housing 100 and extending from the housing 100. The temperature probe 900, such as a thermocouple, is capable of measuring a temperature in a vicinity of the sensor 10, and the temperature measurement can be used to improve accuracy of the pressure signals output by the sensor 10.

In the sensor 10 according to the embodiments shown in FIGS. 1-6, the use of the packages 400, 500, 600 containing the sensor dies 420, 520, 530, 620 on the substrates 410, 510, 610, and the attachment of the packages 400, 500, 600 to the housing 100, cases manufacturing of the sensor 10 by simplifying the positioning of the sensor dies 420, 520, 530, 620 and the connections to the oil 700. Further, positioning the integrated circuit 430 in the oil 700 in close proximity with the sensor die 420 improves signal processing.

What is claimed is:

1. A sensor, comprising:
a housing having a body and a plurality of ports, the body has a first face, an opposite second face, and a plurality of passageways extending through the body, the ports extend from the first face of the body;
a plurality of diaphragms each disposed in one of the ports; and
a package having a substrate and a sensor die attached to the substrate, the substrate is attached to the second face of the body and the sensor die is disposed in a sealed containing space defined in part by the substrate, the substrate has a plurality of substrate passageways extending through the substrate, the passageways of the body include a plurality of first passageways that communicate with the substrate passageways.

2. The sensor of claim 1, wherein the diaphragms are coplanar with one another.

3. The sensor of claim 1, wherein the sensor die is positioned over one of the substrate passageways, the sensor die has a deflectable membrane.

4. The sensor of claim 1, wherein an oil is contained in the ports and in the sealed containing space.

5. The sensor of claim 1, wherein the package has a plurality of sidewalls extending from the substrate to define the sealed containing space and a gel disposed in the sealed containing space around the sensor die.

6. The sensor of claim 1, wherein the body has a plurality of cavities extending into the second face, the passageways of the body include a plurality of second passageways communicating with the cavities.

7. The sensor of claim 6, further comprising a passageway seal disposed in each of the cavities and enclosing the second passageways.

8. The sensor of claim 1, wherein the package has a cover attached to the substrate on a side of the substrate opposite the second face of the body, the cover and the substrate defining the sealed containing space.

9. The sensor of claim 8, wherein the substrate has a contact pad and a trace extending from the sensor die to the contact pad, the contact pad is disposed outside of the sealed containing space.

10. The sensor of claim 8, wherein the passageways of the body communicate with the ports.

11. The sensor of claim 8, wherein the package has an integrated circuit disposed in the sealed containing space and connected to the sensor die.

12. A sensor, comprising:
a housing having a body and a plurality of ports, the body has a first face, an opposite second face, and a cavity extending into the second face, the ports extend from the first face of the body;
a plurality of diaphragms each disposed in one of the ports; and
a package having a substrate and a sensor die attached to the substrate, the substrate is attached to the second face of the body and the sensor die is disposed in a sealed containing space defined in part by the substrate, the substrate is attached to the second face over the cavity and the sealed containing space is defined by the substrate and the body.

13. The sensor of claim 12, wherein the substrate has a base and a flange extending from the base, the flange is attached to the second face of the body and the base extends into the cavity.

14. The sensor of claim 12, wherein the body has a passageway extending through the body and connecting one of the ports with the sealed containing space.

15. The sensor of claim 12, wherein the package has a plurality of pins extending through the substrate and electrically connected to the sensor die.

16. The sensor of claim 12, wherein the cavity is one of a plurality of cavities extending into the second face and the substrate is one of a plurality of substrates of the package, each of the substrates is attached to the second face over one of the cavities to define a plurality of sealed containing spaces.

17. The sensor of claim 16, further comprising a tube extending between the substrates.

18. The sensor of claim 16, wherein the package has a pair of sensor dies each attached to one of the substrates.

19. The sensor of claim 18, wherein a first sensor die of the sensor dies measures an absolute pressure in one of the sealed containing spaces and a second sensor die of the sensor dies measures a differential pressure between the sealed containing spaces.

20. A sensor, comprising:
a housing having a body and a plurality of ports, the body has a first face and an opposite second face, the ports extend from the first face of the body;
a plurality of diaphragms each disposed in one of the ports; and
a package having a substrate and a sensor die attached to the substrate, the substrate is attached to the second face of the body and the sensor die is disposed in a sealed containing space defined in part by the substrate, the package has a plurality of sidewalls extending from the substrate to define the sealed containing space, and a gel is disposed in the sealed containing space around the sensor die.

\* \* \* \* \*